(12) United States Patent
Li et al.

(10) Patent No.: US 9,939,142 B2
(45) Date of Patent: Apr. 10, 2018

(54) BACKLIGHT MODULE AND DISPLAY DEVICE (71) Applicant: Boe Technology Group Co., Ltd., Beijing (CN)

(72) Inventors: Wenbo Li, Beijing (CN); Yongda Ma, Beijing (CN); Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 121 days.

(21) Appl. No.: 14/913,324

(22) PCT Filed: Aug. 19, 2015

(86) PCT No.: PCT/CN2015/087496
§ 371 (c)(1),
(2) Date: Feb. 19, 2016

(87) PCT Pub. No.: WO2016/165252
PCT Pub. Date: Oct. 20, 2016

(65) Prior Publication Data
US 2017/0059145 A1 Mar. 2, 2017

(30) Foreign Application Priority Data
Apr. 14, 2014 (CN) .................... 2015 2 0221885 U (51) Int. Cl.
F21V 29/70 (2015.01)
F21V 19/00 (2006.01)
(Continued)

(52) U.S. Cl.
CPC ............ *F21V 29/70* (2015.01); *F21V 19/001* (2013.01); *G02F 1/1335* (2013.01); *F21Y 2115/10* (2016.08)

(58) Field of Classification Search
CPC ........ F21V 29/70; F21V 19/001; F21V 29/00; F21V 29/503; F21V 29/85; G02F 1/1335; F21Y 2115/10; H01L 33/64
See application file for complete search history.

(56) References Cited

U.S. PATENT DOCUMENTS

| 2005/0162867 | A1  | 7/2005 | Sinofsky |
|---|---|---|---|
| 2010/0177511 | A1  | 7/2010 | Yu |
| 2013/0051062 | A1* | 2/2013 | Lee ..................... H05K 1/0209 362/602 |

FOREIGN PATENT DOCUMENTS

| CN | 101634435 | 1/2010 |
|---|---|---|
| CN | 202188394 | 4/2012 |

(Continued)

OTHER PUBLICATIONS

International Search Report and Written Opinion from PCT/CN15/87496 dated Jan. 6, 2016.

*Primary Examiner* — Bao Q Truong
(74) *Attorney, Agent, or Firm* — Calfee, Halter & Griswold LLP (57) ABSTRACT A backlight module and a display device are disclosed, which relate to the field of display technology and overcome the problem of poor heat dissipation effect of the whole display device. The backlight module comprises a backplane, a light source component fixed to the backplane, and a first heat dissipation layer at least arranged in part of the overlapping zone for the backplane and the light source component. The display device comprises a display panel and the backlight module mentioned above, and the backlight module provided by the embodiment is applied in the display device.

18 Claims, 5 Drawing Sheets (51) Int. Cl.
*G02F 1/1335* (2006.01)
*F21Y 115/10* (2016.01)

(56) References Cited

FOREIGN PATENT DOCUMENTS

| CN | 103727467 | 4/2014 |
| CN | 204494234 | 7/2015 |

* cited by examiner

BACKLIGHT MODULE AND DISPLAY DEVICE

RELATED APPLICATIONS

The present application is the U.S. national phase entry of PCT/CN2015/087496 with an International filing date of Aug. 19, 2015, which claims the benefit of Chinese Application No. 201520221885.8, filed Apr. 14, 2015, the entire disclosures of which are incorporated herein by reference.

FIELD OF THE INVENTION

The present invention relates to the field of display technology, in particular to a backlight module and a display device.

BACKGROUND OF THE INVENTION

With the development of display technology, display devices having various sizes and functions as well as integrated and smart display devices are becoming increasingly popular. Since the configuration and function of such display device are enhanced, the heat generated by the display device would increase significantly.

For example, for the Liquid Crystal Display (LCD) being one of the wide variety of display devices, its heat is mainly generated by the light source components in the backlight module. The light source components comprise a carrier and light emitting diodes (hereinafter called "LED" in short) arranged on the carrier, the carrier contacts the backplane in the backlight module, and the heat generated by LEDs is conducted to the backplane through the carrier, finally the heat is dissipated from the backplane. However, the local area of the carrier contacting the backplane and corresponding to the position of the LED has a relatively higher quantity of heat, thus heat dissipation at such local area is rather slow, causing a poorer heat dissipation effect of the whole display device, which in turn will affect the display performance of the display device.

SUMMARY OF THE INVENTION

An objective of the invention is to provide a backlight module and a display device, so as to improve the overall heat dissipation effect for the display device and ensure the displaying performance of the display device.

In order to achieve above objective, embodiments of the invention provide the following technical solutions.

In one aspect, an embodiment of the invention provides a backlight module comprising a backplane, a light source component fixed to the backplane, and a first heat dissipation layer arranged in an overlapping zone for the backplane and the light source component.

In an embodiment, the backplane may comprise a supporting plate, and the overlapping zone may be a zone where the positions of the supporting plate and the light source component overlap each other or a zone where the supporting plate and the projection of the light source component on the supporting plate overlap.

In another embodiment, the backplane may comprise a supporting plate and a side edge connected with the supporting plate, the overlapping zone may be a zone where the positions of said side edge and the light source component overlap or a zone where said side edge and the projection of the light source component on said side edge overlap.

Further, the first heat dissipation layer can be located above the light source component, and a second heat dissipation layer may be arranged between the backplane and the light source component; or the first heat dissipation layer may be located below the light source component, and a second heat dissipation layer may be arranged above the light source component.

Further, the first heat dissipation layer may be connected with the second heat dissipation layer.

Further, a surface of the backplane facing the light source component may be provided with a groove, and a leveling layer for covering the groove may be arranged on the surface.

Further, the first heat dissipation layer can be located between the backplane and the light source component, and the first heat dissipation layer and the leveling layer may be an integral structure.

Further, the leveling layer may comprise multiple leveling blocks, each of which may cover at least one groove.

Further, the leveling layer may comprise a leveling part for covering the groove and a filling part for filling the groove and connecting with the leveling part.

Further, at least one surface of the first heat dissipation layer can be provided with an adhesive layer.

Further, the first heat dissipation layer can be a light absorption layer.

Further, the first heat dissipation layer can be a layer of carbon black or grapheme.

In another aspect, an embodiment of the invention provides a display device, which may comprise the backlight module according to any one of the embodiments mentioned above.

For the backlight module and display device provided by the embodiments of the invention, the first heat dissipation layer with good heat conduction property is arranged in the overlapping zone for the backplane and the light source component, hence the high heat generated by the LEDs can be conducted to a local area of the first heat dissipation layer corresponding to the LEDs, and the received heat at the local area can be conducted to the whole first heat dissipation layer quickly, so that the heat can be distributed uniformly across the first heat dissipation layer. Compared with the backlight module mentioned in the background of the invention, the heat dissipation area for the heat conducted to the local area is increased, the heat will be uniformly distributed across the first heat dissipation layer and dissipated, which can avoid the occurrence of slow heat dissipation at the local area, such that the heat generated by the LEDs can be dissipated uniformly and quickly, and the heat dissipation effect for the whole display device can be improved, which in turn can ensure the displaying performance of the display device.

BRIEF DESCRIPTION OF THE DRAWINGS

The appended figures are intended to facilitate further understanding of the embodiments of the invention, which are parts of the explanation for the embodiments of the invention. The exemplary embodiments of the invention and explanation thereof are intended to explain the invention, rather than being improper limitation to the invention. In the append figures.

| Reference signs: | |
|---|---|
| 10 - a backplane, | 101 - a supporting plate, |
| 102 - a side edge, | 11 - a light source component, |
| 12- a first heat dissipation layer, | 13- a carrier |
| 14 - a LED, | 15 - a groove, |
| 16- a leveling block | 17- a leveling part |
| 18- a filling part | 19- a second heat dissipation layer |
| 20- a reflection sheet | 21- a leveling layer |
| 22- a display panel | 23- a backlight module |

DETAILED DESCRIPTION OF THE INVENTION

In order to further illustrate the backlight module and display device provided by embodiments of the invention, they will be described in detail in connection with the drawings.

Figure 1:
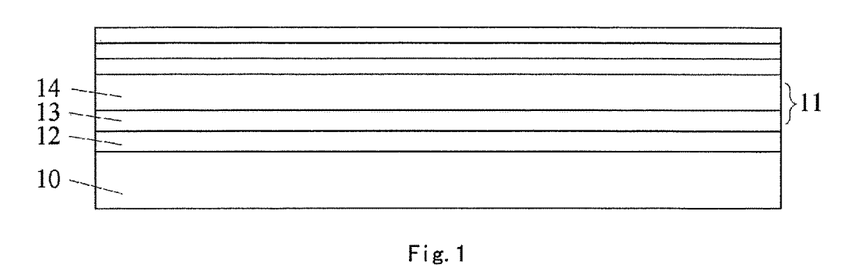
FIG. 1 is a schematic view of the structure of a backlight module according to an embodiment of the invention.
Figure 1A:
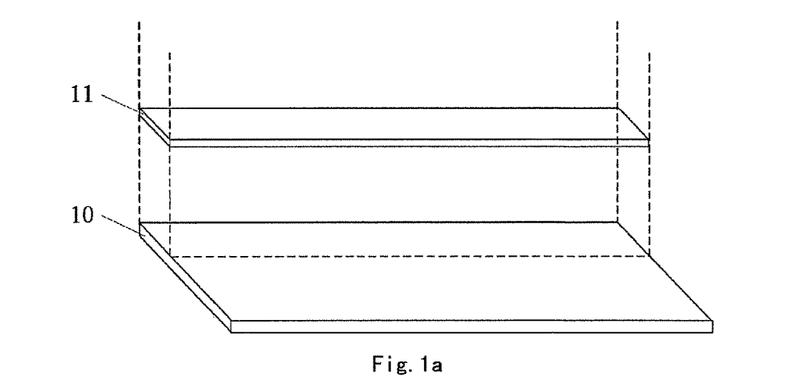
FIG. 1a is a schematic view of an overlapping zone in the backlight module according to an embodiment of the invention.
Figure 2:
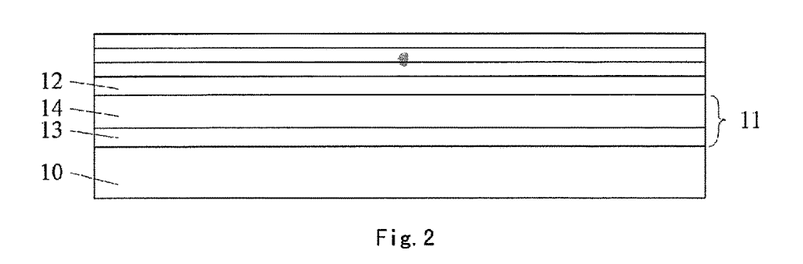
FIG. 2 is a schematic view of the structure of a backlight module according to another embodiment of the invention.
Figure 2A:
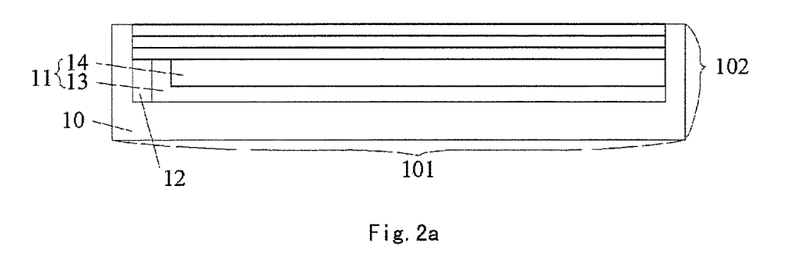
FIG. 2a is a schematic view of the structure of a backlight module according to yet another embodiment of the invention.

Referring to FIG. 1 and FIG. 2a, a backlight module provided by an embodiment of the invention comprises a backplane 10 and a light source component 11 fixed to the backplane 10. The light source component 11 may be fixed to the backplane 10 by a screw, an adhesive layer or a via hole, etc. And the backplane 10 may comprise a supporting plate 101 and a side edge 102. Typically, the side edge 102 is formed by curling up edges of the supporting plate. The backplane 10 can be made of metal with certain hardness and stiffness and having a good heat conduction property, and may be used for accommodating some backlight components such as light source components 11 and optical films and so on. The light source component 11 specifically may comprise a carrier 13 and LEDs 14 arranged on the carrier 13. The carrier 13 is mainly used for carrying the LEDs and can be made from ceramic material, metal material or alloy material, such as aluminum or copper. The backlight module also comprises a first heat dissipation layer 12 at least arranged in part of an overlapping zone for the backplane 10 and the light source component 11, i.e., the first heat dissipation layer 12 can be arranged in part of the overlapping zone, and can also be arranged in the whole overlapping zone. The overlapping zone mentioned herein refers to a zone where the positions of the backplane 10 and the light source component 11 overlap each other or a zone where the backplane 10 and the projection of the light source component 11 on the backplane 10 overlap. For example, as shown in FIG. 1a, the overlapping zone for the backplane 10 and the light source component 11 can be the space surrounded by the dotted line shown in FIG. 1a. Arrangement of the overlapping zone comprises but is not limited to the following two exemplary ways. In one example, the overlapping zone can be a zone where the positions of the supporting plate 101 of the backplane 10 and the light source component 11 overlap each other or a zone where the supporting plate 101 and the projection of the light source component 11 on the supporting plate 101 overlap. For example, the overlapping zone can be above the light source component or below the light source component. The overlapping zone can be located between the backplane and the light source component in case it is below the light source component. For example, as shown in FIG. 1, the first heat dissipation layer 12 is located between the backplane and the light source component, or as shown in FIG. 2, the first heat dissipation layer 12 is above the light source component 11. In another example, the overlapping zone can be a zone where the side edge 102 of the backplane 10 and the light source component overlap, or a zone where the side edge 102 and the projection of the light source component 11 on the side edge 102 overlap. For example, as shown in FIG. 2a, the first heat dissipation layer 12 is located between the side edge 102 of the backplane 10 and the carrier 13.

The first heat dissipation layer 12 may have a good heat conduction property, so as to facilitate the heat to be dissipated uniformly and quickly by the backlight module. For example, the heat conductivity of the first heat dissipation layer 12 can be greater than that of the backplane 10, such that the heat at a certain location on the first heat dissipation layer 12 can be conducted to the whole first heat dissipation layer 12 quickly.

In another embodiment, a heat conduction layer can also be arranged between the carrier 13 of the light source component 11 and the backplane 10, the heat conduction layer can be made from different material than that of the carrier 13, and can also be formed as an integral structure with the carrier 13 of the light source component 11.

In an embodiment, the material of the first heat dissipation layer 12 can be different from that of the carrier 13. The first heat dissipation layer 12 can be a light absorption layer, such as a layer of black material or other deep color material. Alternatively, the first heat dissipation layer 12 may be a layer of carbon black or grapheme, each of which has good heat conduction property.

It is noted that, in the backlight module described as the embodiment of the invention, a variety of optical films may also be included, such as a reflection sheet, a light guide plate, a diffusion plate, a prism sheet and a diffusion sheet, etc. Since the technique for applying such optical films in the backlight module is well known, specific arrangements for the optical films in the backlight module in the embodiment of the invention will not be described in detail.

In the backlight module of the embodiment of the invention, the first heat dissipation layer 12 with good heat conduction property is arranged in the overlapping zone of the backplane 10 and the light source component 11, hence the high heat generated by the LEDs 14 can be conducted to the local area of the first heat dissipation layer 12 corresponding to the LEDs 14, and the received heat at the local area can be conducted to the whole first heat dissipation layer 12 quickly, so that the heat can be distributed uniformly across the first heat dissipation layer 12. Compared with the backlight module mentioned in the background of the invention, the heat dissipation area for the heat conducted to the local area is increased, the heat will be uniformly distributed across the first heat dissipation layer 12 and dissipated, which can avoid the occurrence of slow heat dissipation at the local area, such that the heat generated by the LEDs 14 can be dissipated uniformly and quickly, and the heat dissipation effect for the whole display device can be improved, which in turn can ensure the displaying performance of the display device.

Figure 3:
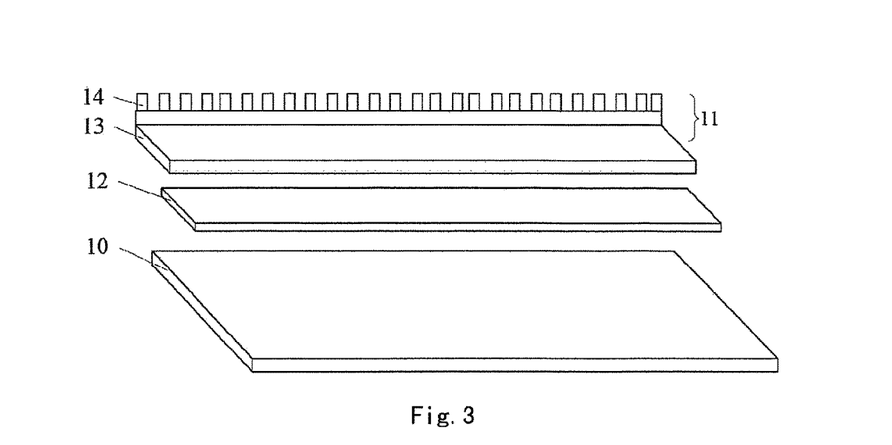
FIG. 3 is a schematic view of the structure of a backlight module according to yet another embodiment of the invention.
Figure 4:
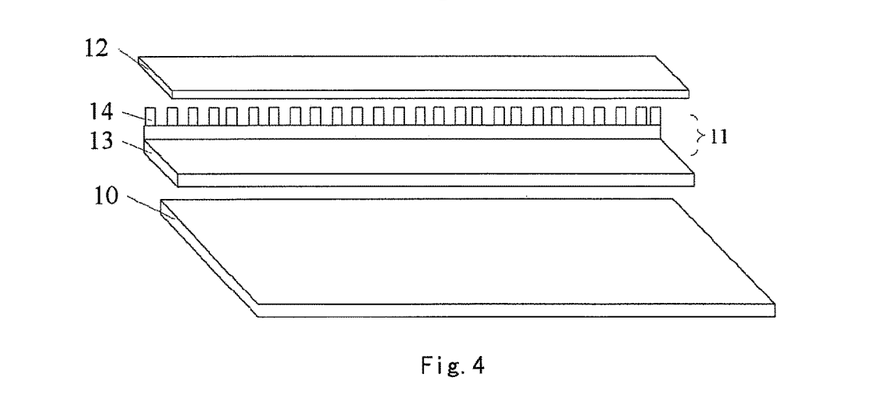
FIG. 4 is a schematic view of the structure of a backlight module according to yet another embodiment of the invention.

Next, taking a backlight module of side light type as an example, a specific application for the embodiment of the invention will be described. Referring to FIG. 3, a light source component 11 in the backlight module of side light type may comprise a carrier 13 and a plurality of LEDs 14 arranged vertically on one side of the carrier 13. The overlapping zone can be below the light source component 11, the first heat dissipation layer 12 is arranged on the backplane 10, and the first heat dissipation layer 12 can be a light absorption layer such as a layer of black material or other deep color material, for example, the first heat dissipation layer 12 can be a layer of carbon black or grapheme, each of which has a good heat conduction property. In this way, light leakage for the backlight module can be reduced or avoided. The carrier 13 is arranged above the first heat dissipation layer 12, one side of the carrier 13 is provided with the plurality of LEDs 14 and the carrier 13 can be made from metal plate with good heat conduction property such as an aluminum plate. Also, a driving circuit board for driving the LEDs can be arranged on the side of the carrier 13. The heat generated by the plurality of LEDs 14 on the side of the carrier 13 is conducted to the first heat dissipation layer 12, then distributed uniformly across the first heat dissipation layer 12 and dissipated through the backplane 10, thereby enhancing the heat dissipation speed and improving the heat dissipation effect for the whole display device. Alternatively, referring to FIG. 4, the overlapping zone can be above the light source component, and the carrier may be arranged above the backplane, the plurality of LEDs 14 can be arranged vertically on one side of the carrier 13, also the first heat dissipation layer 12 can be arranged above the plurality of LEDs 14. Therefore, the heat generated by the plurality of LEDs 14 can be conducted to the whole first heat dissipation layer 12, and then dissipated uniformly and quickly. Hereinbefore, a structure of the backlight module of side light type is described in detail by example of the overlapping zone located above or below the light source component. Similarly, for the backlight module of side light type, it is also be applicable that the overlapping zone is located at other positions, such as between the side edge of the backplane and the light source component, etc. The corresponding structure of the backlight module can be referred to FIG. 2a, which will not be repeated herein.

It is noted that, in order to facilitate a secure connection of the first heat dissipation layer 12 and members below or above it, at least one surface of the first heat dissipation layer 12 can be provided with an adhesive layer. For example, in case the first heat dissipation layer 12 is located between the backplane 10 and the light source component 11, a first contact surface of the first heat dissipation layer 12 facing the backplane 10 can be provided with an adhesive layer, and a second contact surface of the first heat dissipation layer 12 facing the light source component 11 can be provided with an adhesive layer, the adhesive layers can bond the first heat dissipation layer 12 and the backplane 10 closely, or can bond the first heat dissipation layer 12 and the carrier 13 of the light source component 11 or other members closely, and the adhesive layer may have a good heat conduction property to conduct heat well. However, the connection of the first heat dissipation layer 12 and other members is not limited to this, for example, the first heat dissipation layer 12 can also be bonded with members above or below it by a bolt or a via hole, and so on.

Figure 5:
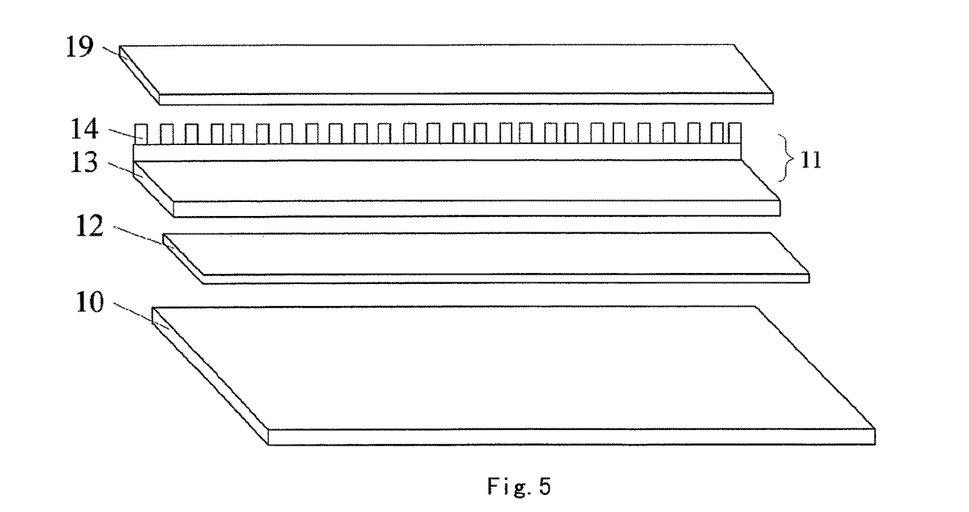
FIG. 5 is a schematic view of the structure of a backlight module according to yet another embodiment of the invention.

Heat dissipation layers can be arranged simultaneously above and below the light source component 11, so as to further improve the heat dissipation effect for the whole display device. For example, the first heat dissipation layer 12 may be above the light source component 11, and a second heat dissipation layer can be arranged between the backplane 10 and the light source component 11. Alternatively, the first heat dissipation layer 12 may be below the light source component 11, and a second heat dissipation layer can be arranged above the light source component 11. In the following, it will be illustrated by example of the overlapping zone located between the backplane 10 and the light source component 11. Referring to FIG. 5, the first heat dissipation layer 12 is arranged above the backplane 10, the carrier 13 and a plurality of LEDs 14 are arranged above the first heat dissipation layer 12, and a second heat dissipation layer 19 can be arranged above the plurality of LEDs 14. Similar to the first heat dissipation layer 12, the second heat dissipation layer 19 can be a light absorption layer, such as a layer of black material or other deep color material. For example, the second heat dissipation layer 19 can be a layer of carbon black or grapheme. The second heat dissipation layer 19 also can reduce or avoid light leakage phenomenon and ensure the flatness of the surface above the plurality of LEDs 14.

Figure 6:
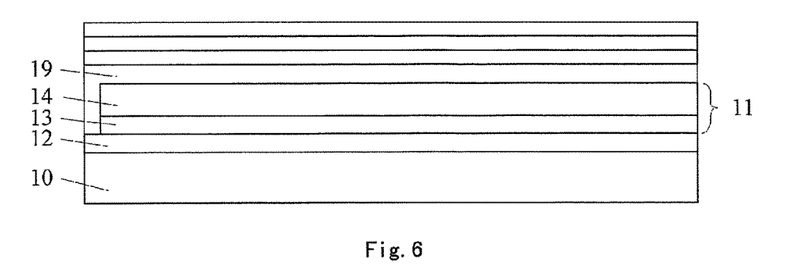
FIG. 6 is a schematic view showing the connection of the first heat dissipation layer and the second heat dissipation layer in the backlight module according to another embodiment of the invention.

In an embodiment of the invention, the first heat dissipation layer 12 and the second heat dissipation layer 10 may be connected together, so that the heat generated by the plurality of LEDs 14 can be dissipated more quickly and uniformly. For example, as shown in FIG. 6, the second heat dissipation layer 19 may extend and keep off the plurality of LEDs 14 and carrier 13, and contact the first heat dissipation layer 12, so that the heat can be conducted between the first heat dissipation layer 12 and the second heat dissipation layer 19, and the area for heat conduction can be increased, thus the heat in the display device can be dissipated more quickly. The way for connecting the first heat dissipation layer 12 and the second heat dissipation 19 is not limited to this, which will not be defined herein.

Figure 7:
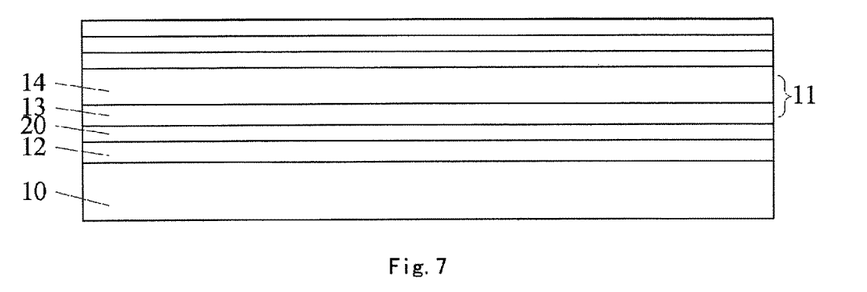
FIG. 7 is a schematic view of the structure of a backlight module according to yet another embodiment of the invention.

Next, a specific application of the embodiment of the invention will be illustrated by example of a direct type backlight module. The light source component of the direct type backlight module may comprise a carrier and a plurality of LEDs arranged on the carrier in array. Referring to FIG. 7, the overlapping zone can be located below the light source component 11, a first heat dissipation layer 12 is arranged above the backplane 10, a reflection sheet 20 is arranged above the first heat dissipation layer 12, a carrier 13 may be arranged above the reflection sheet 20, and the plurality of LEDs in an array are arranged on the carrier 13. The carrier 13 can be made of metal plate with a good conduction property, such as an aluminium plate. For the direct type backlight module, there is a higher heat dissipation requirement for the area below the reflection sheet 20. The heat generated by the plurality of LEDs 14 and the reflection sheet 20 is conducted to the first heat dissipation layer 12, then the heat is uniformly distributed across the first heat dissipation layer 12 and dissipated quickly through the backplane 10, thus the heat dissipation speed can be enhanced, and the heat dissipation effect for the whole display device can be improved. In addition, regarding to the case where the overlapping zone is located above the light source component in the direct type backlight module, it is similar to the embodiment where the overlapping zone is located above the light source component in the backlight module of side light type, which can be referred to the aforementioned embodiment and will not be described in detail herein.

Figure 8:
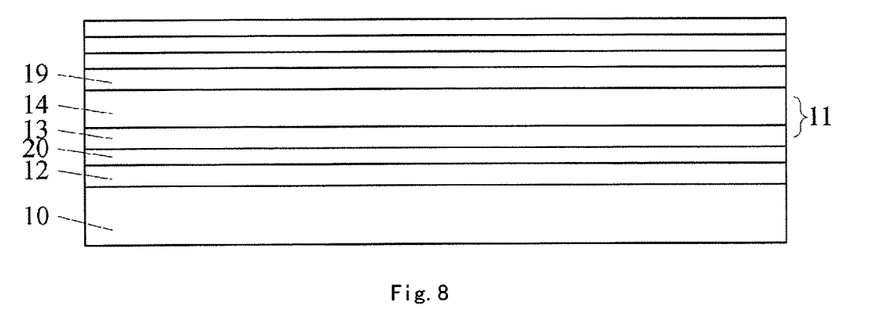
FIG. 8 is a schematic view of the structure of a backlight module according to yet another embodiment of the invention.

Similarly, heat dissipation layers can be arranged above and below the light source component 11 simultaneously, so as to further improve the heat dissipation effect for the whole display device, and the specific implementation can be similar to the embodiments above. Next, it will be illustrated by an example in which the first heat dissipation layer 12 is located between the backplane 10 and the light source component 11. Referring to FIG. 8, the first heat dissipation layer 12 can be arranged above the backplane 10, the reflection sheet 20 can be arranged above the first heat dissipation layer 12, and the carrier 13 and the plurality of LEDs 14 can be provided above the reflection sheet 20, moreover, a second heat dissipation layer 19 can be arranged above the plurality of LEDs 14. In an embodiment, the first heat dissipation layer 12 can be connected with the second heat dissipation layer 19, and explanation about the first heat dissipation layer 12, the second heat dissipation layer 19 as well as the connection of them can be referred to the foregoing embodiments, which will not be repeated herein.

Figure 9:
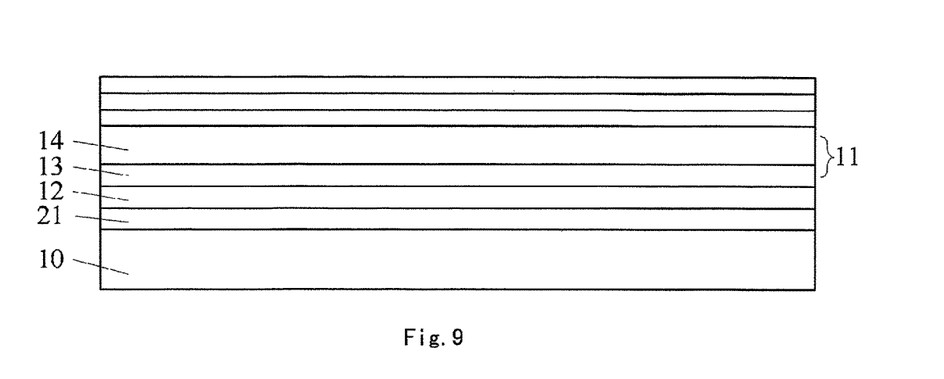
FIG. 9 is a schematic view of the structure of a backlight module according to yet another embodiment of the invention.
Figure 10:
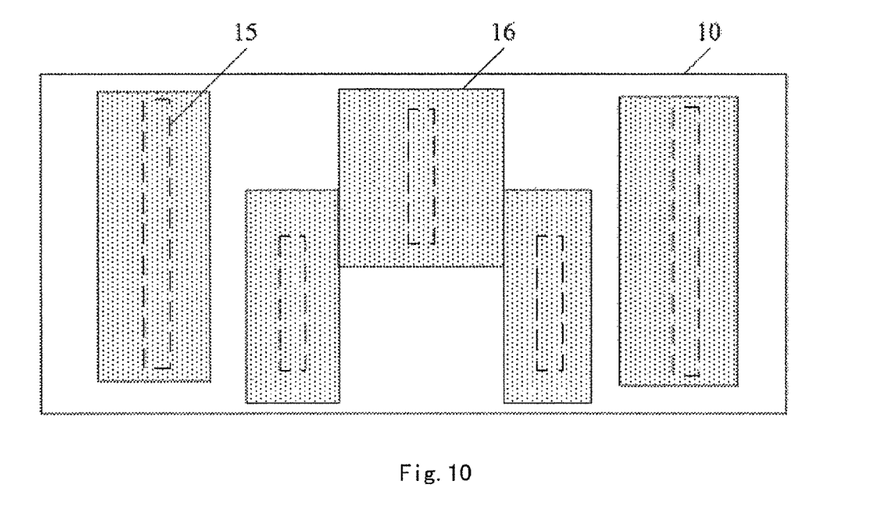
FIG. 10 is a schematic view showing the position relationship between the leveling block and the groove according to yet another embodiment of the invention.

In an backlight module according to an embodiment of the invention, the first heat dissipation layer may be located between the backplane 10 and the light source component 11, and one surface of the backplane 10 may be provided with multiple protrusions for mounting the driving circuit board or wall-mounted supporting members. Accordingly, the other surface of the backplane 10 opposite to this surface, i.e. the surface of the backplane 10 facing the light source component 11 may be provided with grooves corresponding to the protrusions, which can be formed at the same time with the protrusions. Since the light source component 11 may has a high requirement for the flatness of the surface of the member that contacts the light source component 11, in this case, to satisfy the requirement for the flatness mentioned above, a leveling layer 21 can be arranged on the surface of the backplane facing the light source component for covering the grooves, as shown in FIG. 9. The leveling layer 21 covers the grooves, so that the surface that contacts the light source component has a higher flatness. The leveling layer 21 can be located between the first heat dissipation layer 12 and the backplane 10, and the first heat dissipation layer 12 can contact the leveling layer 21, or, other members can also be arranged between the first heat dissipation layer 12 and the leveling layer 21, and the relative position relationship between the first heat dissipation layer 12 and the leveling layer 21 is not limited herein. In an embodiment, the leveling layer 21 may also have a good heat conduction property, and can conduct the received heat to the backplane 10, allowing the heat to escape from the backplane 10. In an embodiment, the leveling layer 21 can cover the whole surface of the backplane 10 facing the light source component 11, hence the flatness of the surface contacting the light source component 11 can be ensured to the greatest extent. Alternatively, the leveling layer 21 may comprise multiple leveling blocks, each of which may cover at least one groove. For example, as shown in FIG. 10, the surface of the backplane facing the light source component 11 may be provided with five grooves 15, and the leveling layer 21 may comprise five leveling blocks 16, each of which can cover one groove 15 correspondingly. In this way, in addition to ensuring the flatness of the surface contacting the light source component 11, the area of the leveling layer 21 can be reduced, and the material for manufacturing the leveling layer 21 can be saved, thereby saving the cost for manufacturing the backlight module in the embodiment of the invention.

It is noted that, the first heat dissipation layer 12 and the leveling layer 21 can be an integral structure, so as to further save the material for manufacturing the leveling layer 21 and the first heat dissipation layer 12. For example, the first heat dissipation layer 12 can be reused as the leveling layer 21, the effect of fast and uniform heat dissipation and the effect of improving flatness can be achieve simultaneously.

Figure 11:
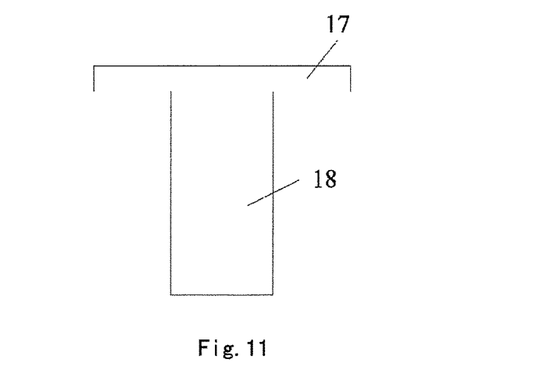
FIG. 11 is a schematic view of the structure of the leveling layer according to yet another embodiment of the invention.

As shown in FIG. 11, in another embodiment, the leveling layer 21 may comprise a leveling part 17 for covering the groove 15 and a filling part 18 for filling the groove 15 and connected with the leveling part 17, so as to prevent the damage of the leveling layer 21 due to the high weight of the members above the backplane 10.

Figure 12:
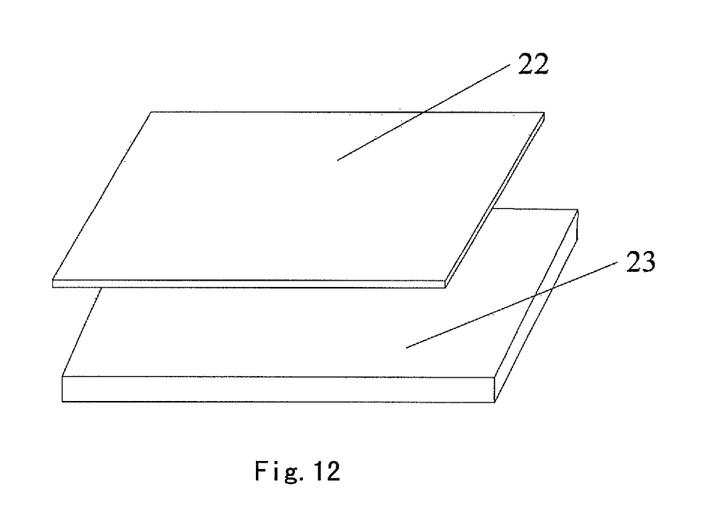
FIG. 12 is a schematic view of the structure of a display device according to yet another embodiment of the invention.

Referring to FIG. 12, another embodiment of the invention provides a display device, which may comprise a display panel 22 and the backlight module 23 as described in the above embodiments. Obviously, the backlight module 23 in the display device can have the same advantages as the ones described in the above embodiments, which will not be repeated here. Since the heat can be distributed uniformly across the first heat dissipation layer, the occurrence of slow heat dissipation at a local area can be avoided, the heat dissipation effect of the whole display device can be improved, and the displaying performance of the display device can be ensured. The display device can be any product or component having a displaying function, such as a liquid crystal panel, an electronic paper, a mobile phone, a tablet computer, a television, a display, a notebook computer, a digital photo frame, a navigator and the like.

In the description of the above embodiments, specific features, structures, materials or characteristics may be combined in any one or more of the embodiments or examples in a suitable manner.

The disclosure herein includes specific embodiments of the present invention, but the protection scope of the present invention shall not be limited thereto. Any modification or substitution that can be easily conceived by a person having ordinary skill in the present technical field shall fall within the protection scope of the present invention. Therefore, the protection scope of the present invention should be subject to the protection scope of the claims.

The invention claimed is:
1. A backlight module, comprising
a backplane;
a light source component fixed to the backplane;
an overlapping zone formed by the backplane and the light source; and
a first heat dissipation layer arranged in the overlapping zone;

wherein a surface of the backplane facing the light source component is provided with at least one groove, the groove corresponding to a protrusion on a surface of the backplane facing away from the light source component; and wherein a leveling layer for covering the groove is arranged on the surface of the backplane facing the light source component.

2. The backlight module according to claim 1, wherein:
the backplane comprises a supporting plate; and
the overlapping zone is formed where orthographic projections of the light source component and the support plate overlap.

3. The backlight module according to claim 1, wherein:
the backplane comprises a supporting plate and a side edge connected with the supporting plate; and
the overlapping zone is formed where orthographic projections of the light source component and the side edge overlap.

4. The backlight module according to claim 2, wherein:
one of the first heat dissipation layer and a second heat dissipation layer is arranged above the light source component;
and the other of the first heat dissipation layer and the second heat dissipation layer is arranged between the backplane and the light source component.

5. The backlight module according to claim 4, wherein the first heat dissipation layer is connected with the second heat dissipation layer.

6. The backlight module according to claim 1, wherein:
the first heat dissipation layer is located between the backplane and the light source component; and
the first heat dissipation layer and the leveling layer are an integral structure.

7. The backlight module according to claim 1, wherein:
the leveling layer comprises a plurality of leveling blocks; and
each leveling layer covers at least one groove.

8. The backlight module according to claim 6, wherein:
the leveling layer comprises plurality of leveling blocks; and
each leveling layer covers at least one groove.

9. The backlight module according to claim 1, wherein the leveling layer comprises:
a leveling part for covering at least one groove; and
a filling part for filling at least one groove, wherein the filling part is connected to the leveling part.

10. The backlight module according to claim 6, wherein the leveling layer comprises:
a leveling part for covering at least one groove; and
a filling part for filling at least one groove, wherein the filling part is connected to the leveling part.

11. The backlight module according to claim 1, wherein at least one surface of the first heat dissipation layer is provided with an adhesive layer.

12. The backlight module according to claim 1, wherein the first heat dissipation layer is a light absorption layer.

13. The backlight module according to claim 1, wherein the first heat dissipation layer is a layer of carbon black or grapheme.

14. A display device comprising a backlight module, the backlight module comprising:
a backplane;
a light source component fixed to the backplane;
an overlapping zone formed by the backplane and the light source; and
a first heat dissipation layer arranged in the overlapping zone;
wherein a surface of the backplane facing the light source component is provided with at least one groove, the groove corresponding to a protrusion on a surface of the backplane facing away from the light source component; and
wherein a leveling layer for covering the groove is arranged on the surface of the backplane facing the light source component.

15. The display device according to claim 14, wherein:
the backplane comprises a supporting plate; and
the overlapping zone is formed where orthographic projections of the light source component and the support plate overlap.

16. The display device according to claim 14, wherein:
the backplane comprises a supporting plate and a side edge connected with the supporting plate; and
the overlapping zone is formed where orthographic projections of the light source component and the side edge overlap.

17. The display device according to claim 15, wherein:
one of the first heat dissipation layer and a second heat dissipation layer is arranged above the light source component;
and the other of the first heat dissipation layer and the second heat dissipation layer is arranged between the backplane and the light source component.

18. The display device according to claim 17, wherein the first heat dissipation layer is connected with the second heat dissipation layer.

* * * * *